(12) United States Patent
Tajiri et al.

(10) Patent No.: US 10,303,015 B2
(45) Date of Patent: May 28, 2019

(54) TERMINAL CONNECTION STRUCTURE OF CONDUCTIVE FILM FOR TOUCH PANEL AND TOUCH PANEL

(71) Applicant: FUJIFILM Corporation, Tokyo (JP)

(72) Inventors: Shin Tajiri, Ashigara-kami-gun (JP); Kensuke Katagiri, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 155 days.

(21) Appl. No.: 15/664,443

(22) Filed: Jul. 31, 2017

(65) Prior Publication Data

US 2017/0329170 A1    Nov. 16, 2017

Related U.S. Application Data

(63) Continuation of application No. PCT/JP2016/053649, filed on Feb. 8, 2016.

(30) Foreign Application Priority Data

Mar. 20, 2015  (JP) .................................. 2015-058199

(51) Int. Cl.
  *G02F 1/1345*    (2006.01)
  *G06F 3/041*    (2006.01)
  (Continued)

(52) U.S. Cl.
  CPC ...... *G02F 1/13452* (2013.01); *G02F 1/13338* (2013.01); *G06F 3/041* (2013.01);
  (Continued)

(58) Field of Classification Search
  CPC .............. G02F 1/1345; G02F 1/13452; G02F 1/13458; G02F 1/13338; G06F 3/041;
  (Continued)

(56) References Cited

U.S. PATENT DOCUMENTS

2003/0086045 A1* 5/2003 Ono ................ G02F 1/134309
                                                            349/141
2003/0094305 A1* 5/2003 Ueda .................. G02F 1/13452
                                                            174/254
(Continued)

FOREIGN PATENT DOCUMENTS

CN    103677363 A    3/2014
JP    4-160624 A    6/1992
(Continued)

OTHER PUBLICATIONS

Japanese Notification of Reasons for Refusal for corresponding Japanese Application No. 2017-507571, dated Nov. 28, 2017, with machine translation.

(Continued)

*Primary Examiner* — Tom V Sheng
(74) *Attorney, Agent, or Firm* — Birch, Stewart, Kolasch & Birch, LLP (57) ABSTRACT

External connection terminals in a conductive film and circuit-side terminals in a flexible circuit are respectively arranged in a first direction and are disposed through an anisotropic conductive membrane so as to at least partially overlap each other, the conductive film has detection electrodes and lead wires respectively connecting the detection electrodes to the external connection terminals, at least two external connection terminals have connection portions with the lead wires disposed at different locations, and, in each external connection terminal, an overlapping region between the circuit-side terminal and the anisotropic conductive membrane has ends in a second direction orthogonal to the first direction, and a width W1 of a first end in the first direction being located on a connection portion side between the external connection terminal and the lead wire is smaller (Continued)

than a width W2 in the first direction of the external connection terminal overlapping the first end.

18 Claims, 7 Drawing Sheets

(51) Int. Cl.
*G06F 3/044* (2006.01)
*G02F 1/1333* (2006.01)
(52) U.S. Cl.
CPC ............ *G06F 3/044* (2013.01); *G06F 3/0416* (2013.01); *G06F 2203/04102* (2013.01); *G06F 2203/04112* (2013.01)
(58) Field of Classification Search
CPC ................... G06F 3/0416; G06F 3/044; G06F 2203/04102; G06F 2203/04103; G06F 2203/04112
See application file for complete search history.

(56) References Cited

U.S. PATENT DOCUMENTS

| | | | | |
|---|---|---|---|---|
| 2003/0201985 A1* | 10/2003 | Katakami | ............... | G06F 3/045 345/173 |
| 2004/0207796 A1* | 10/2004 | Morishita | ........... | G02F 1/13452 349/151 |
| 2005/0231495 A1* | 10/2005 | Ishibashi | .............. | G09G 3/3611 345/204 |
| 2006/0072060 A1* | 4/2006 | Lu | ........................ | G02F 1/13452 349/151 |
| 2007/0013856 A1* | 1/2007 | Watanabe | ........... | G02F 1/13452 349/150 |
| 2011/0227846 A1* | 9/2011 | Imazeki | .................. | G06F 3/044 345/173 |
| 2014/0020944 A1* | 1/2014 | Misaki | ............... | G02B 27/2214 174/261 |

FOREIGN PATENT DOCUMENTS

| | | |
|---|---|---|
| JP | 2005-141643 A | 6/2005 |
| JP | 2007-26846 A | 2/2007 |
| WO | WO 2015/004970 A | 1/2015 |

OTHER PUBLICATIONS

Notification of Transmittal of Translation of the International Preliminary Report on Patentability; International Preliminary Report on Patentability and English translation of Written Opinion of the International Searching Authority, dated Oct. 5, 2017, issued in PCT/JP2016/053649 (Forms PCT/IB/338, PCT/IB/273 and PCT/ISA/237).

International Search Report (PCT/ISA/210) issued in PCT/JP2016/053649, dated Mar. 8, 2016.

Written Opinion of the International Search Authority (PCT/ISA/237) issued in PCT/JP2016/053649, dated Mar. 8, 2016.

* cited by examiner

FIG. 10B ns in the conductive film for a touch panel and is disposed so as to be present between the external connection terminals and the plurality of circuit-side terminals in the flexible circuit board. At this time, since the anisotropic conductive membrane traverses the respective external connection terminals, a pair of end portions in a direction orthogonal to the extension direction of the anisotropic conductive membrane is present above the respective external connection terminal.

TERMINAL CONNECTION STRUCTURE OF CONDUCTIVE FILM FOR TOUCH PANEL AND TOUCH PANEL

CROSS-REFERENCE TO RELATED APPLICATIONS

This application is a Continuation of PCT International Application No. PCT/JP2016/053649 filed on Feb. 8, 2016, which claims priority under 35 U.S.C. § 119(a) to Japanese Patent Application No. 2015-058199 filed on Mar. 20, 2015. The above application is hereby expressly incorporated by reference, in its entirety, into the present application.

BACKGROUND OF THE INVENTION

1. Field of the Invention

The present invention relates to a terminal connection structure of a conductive film for a touch panel and particularly to a terminal connection structure of a conductive film for a touch panel for connecting a conductive film for a touch panel and a flexible circuit board through an anisotropic conductive membrane.

In addition, the present invention also relates to a touch panel having the terminal connection structure of a conductive film for a touch panel.

2. Description of the Related Art

In recent years, in a variety of electronic devices such as mobile information devices, touch panels which are used in combination with display devices such as liquid crystal display devices and in which input operation to electronic devices is carried out by touching screens have been distributed. Inside touch panels, there are cases in which conductive films for touch panels are connected to driving circuits through flexible circuit boards having flexibility.

For example, CN103677363A describes a touch panel in which a conductive film for a touch panel is connected to a flexible circuit board.

SUMMARY OF THE INVENTION

The conductive film for a touch panel described in CN103677363A has a plurality of detection electrodes and a plurality of external connection terminals for connecting the detection electrodes to the flexible circuit board, and the detection electrodes and the external connection terminals are connected to each other with lead wires so as to correspond each other. In addition, the external connection terminals are arranged at constant intervals. Similarly, the flexible circuit board has a plurality of circuit-side terminals arranged at constant intervals in the same direction as the arrangement direction of the external connection terminals.

For the touch panel, there is a demand for thickness reduction, the detection electrodes and the external connection terminals in the conductive film for a touch panel are also formed to be extremely thin, and the conductive film for a touch panel and the flexible circuit board are thermally compressed through an anisotropic conductive membrane, thereby connecting the plurality of external connection terminals in the conductive film for a touch panel to the plurality of circuit-side terminals in the flexible circuit board.

The anisotropic conductive membrane extends in a direction of traversing the plurality of external connection termi- In a case in which the conductive film for a touch panel and the flexible circuit board are thermally compressed through the anisotropic conductive membrane, the plurality of external connection terminals in the conductive film for a touch panel are respectively connected to the corresponding circuit-side terminals in the flexible circuit board.

However, in the case of thermal compression, the flexible circuit board, the anisotropic conductive membrane, and the conductive film for a touch panel, which are overlapped with each other, are pressed, and thus, in places at which the plurality of external connection terminals in the conductive film for a touch panel, the anisotropic conductive membrane, and the circuit-side terminals in the flexible circuit board are overlapped with each other, shear forces are applied to the respective external connection terminals from the pair of end portions of the anisotropic conductive membrane located above the external connection terminals. In addition, as described above, the external connection terminals in the conductive film for a touch panel are formed to be extremely thin. Therefore, due to misalignment or the like among the flexible circuit board, the anisotropic conductive membrane, and the conductive film for a touch panel during thermal compression, compressing pressure does not evenly apply to the entire surface of the anisotropic conductive membrane, and, in a case in which the compressing pressure unevenly applies to any one of the pair of end portions along the extension direction of the anisotropic conductive membrane, there are cases in which the external connection terminals in the conductive film for a touch panel are broken by the end portions of the anisotropic conductive membrane.

Particularly, in a case in which the respective circuit-side terminals in the flexible circuit board have widths that are equal to or larger than the widths of the corresponding external connection terminals in the conductive film for a touch panel and cover the external connection terminals in the width direction, that is, the direction in which the anisotropic conductive membrane traverses the external connection terminals, in a case in which the external connection terminals break, the external connection terminals break from one end portion to the other end portion in the width direction of the external connection terminals, and the external connection terminals are divided into two pieces.

Here, in a case in which the plurality of lead wires are respectively connected to the corresponding external connection terminals on the same side of the anisotropic conductive membrane that traverses the plurality of external connection terminals, even when thermal compression pressure unevenly applies to the end portion out of the pair of end portions of the anisotropic conductive membrane opposite to the connection portion side between the external connection terminals and the lead wires and thus the external connection terminals break, electron conduction between the plurality of lead wires and the plurality of circuit-side terminals in the flexible circuit board is ensured.

However, as described in CN103677363A, in a case in which the plurality of lead wires are connected to the corresponding external connection terminals at mutually different locations, even when thermal compression pressure unevenly applies to any one of the pair of end portions of the anisotropic conductive membrane and thus the external connection terminals break, electron conduction from the lead wires to the corresponding circuit-side terminals in the flexible circuit board is impossible in some of the external connection terminals, and the conductive film for a touch panel and the flexible circuit board cannot be electrically connected to each other.

This invention has been made in order to solve the above-described problem, and an object of the present invention is to provide a terminal connection structure of a conductive film for a touch panel with which the conductive film for a touch panel can be reliably electrically connected to the flexible circuit board through the anisotropic conductive membrane.

In addition, another object of this invention is to provide a touch panel having the above-described terminal connection structure of the conductive film for a touch panel.

A terminal connection structure of a conductive film for a touch panel according to this invention is a terminal connection structure of a conductive film for a touch panel which connects a plurality of external connection terminals in the conductive film for a touch panel to a plurality of circuit-side terminals in a flexible circuit board through an anisotropic conductive membrane, in which the plurality of external connection terminals and the plurality of circuit-side terminals are respectively arranged in a first direction and are disposed so as to at least partially overlap each other, the conductive film for a touch panel has a plurality of detection electrodes and a plurality of lead wires respectively connecting the plurality of detection electrodes to the plurality of external connection terminals, out of the plurality of external connection terminals, at least two external connection terminals have connection portions with the plurality of lead wires disposed at different locations, the anisotropic conductive membrane extends in the first direction and is disposed between the plurality of external connection terminals and the plurality of circuit-side terminals, and, in each of the external connection terminals, an overlapping region between the circuit-side terminal and the anisotropic conductive membrane has a pair of end portions in a second direction orthogonal to the first direction, and, out of the pair of end portions, a width $W1$ of a first end portion in the first direction being located on a connection portion side between the external connection terminal and the lead wire is smaller than a width $W2$ in the first direction of the external connection terminal overlapping the first end portion.

In each of the external connection terminals, out of the pair of end portions, a width $W3$ of a second end portion in the first direction being located on a side opposite to the connection portion side between the external connection terminal and the lead wire is preferably smaller than a width $W4$ in the first direction of the external connection terminal overlapping the second end portion.

The plurality of external connection terminals each may have a rectangular shape, and, in the at least two of the plurality of external connection terminals, the plurality of lead wires may be connected to mutually different sides of the rectangular shape. In addition, in the at least two of the plurality of external connection terminals, the lead wires may be connected to mutually facing sides of the rectangular shape.

The plurality of circuit-side terminals may respectively have a plurality of terminal-branching portions extending in the second direction, and a sum $W5$ of widths of the plurality of terminal-branching portions in the first direction in the first end portion may be smaller than the width $W2$ in the first direction of the external connection terminal overlapping the first end portion. In this case, a sum $W6$ of widths of the plurality of terminal-branching portions in the first direction in the second end portion is desirably smaller than the width $W4$ in the first direction of the external connection terminal overlapping the second end portion.

The conductive film for a touch panel may have an insulating substrate having a thickness of 50 μm or less, and the plurality of detection electrodes and the plurality of lead wires may be disposed on a front surface of the insulating substrate. The plurality of detection electrodes are desirably formed of mesh-shaped thin metal wires. In addition, the thin metal wire may be formed of at least one of gold, silver, or copper.

In addition, it is also possible to constitute a touch panel comprising the above-described terminal connection structure of a conductive film for a touch panel.

According to this invention, due to the terminal connection structure of the conductive film for a touch panel, the overlapping region between the circuit-side terminal and the anisotropic conductive membrane has a pair of end portion in the second direction orthogonal to the first direction, and, out of the pair of end portions, the width $W1$ of the first end portion in the first direction being located on the connection portion side between the external connection terminal and the lead wire is smaller than the width $W2$ in the first direction of the external connection terminal overlapping the first end portion, and thus it is possible to reliably electrically connect the conductive film for a touch panel to the flexible circuit board through the anisotropic conductive membrane.

DESCRIPTION OF THE PREFERRED EMBODIMENTS

Embodiment 1

Hereinafter, embodiments of this invention will be described on the basis of the accompanying drawings.

Figure 1:
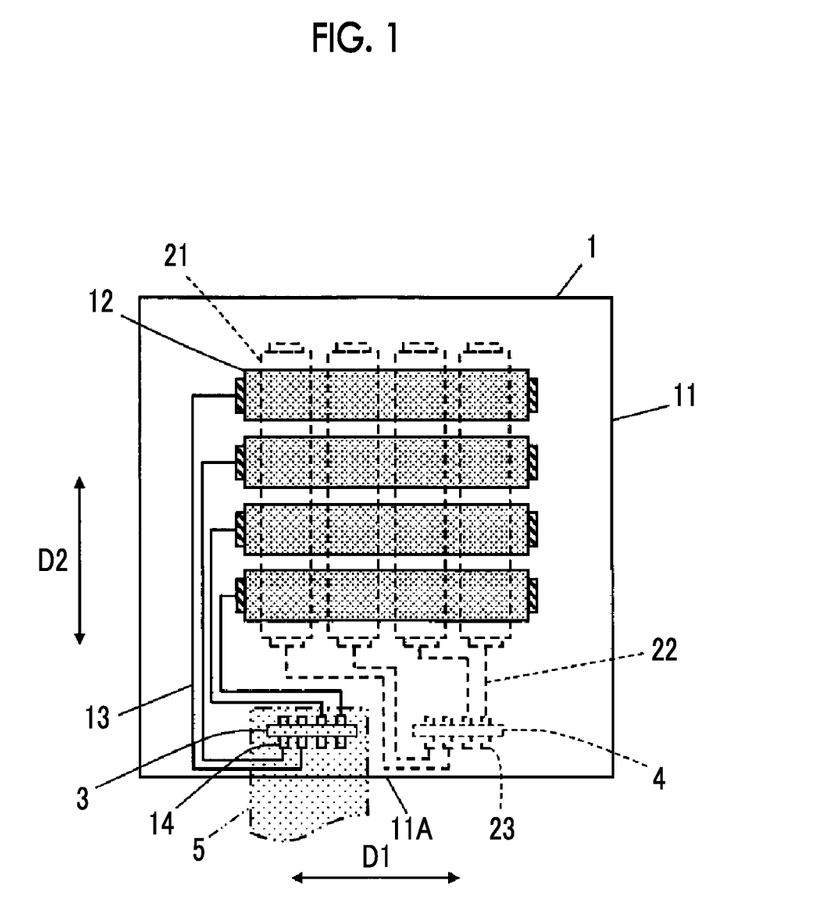
FIG. 1 is a plan view illustrating a conductive film for a touch panel to which a terminal connection structure of a conductive film for a touch panel according to Embodiment 1 of this invention is applied.

FIG. 1 illustrates the constitution of a conductive film for a touch panel to which a terminal connection structure of a conductive film for a touch panel according to Embodiment 1 of this invention is applied. This conductive film for a touch panel 1 has a rectangular transparent insulating substrate 11. On the front surface of the insulating substrate 11, a plurality of first detection electrodes 12 which respectively extend in a first direction D1 and are arranged in parallel in a second direction D2 orthogonal to the first direction D1 are formed, a plurality of first lead wires 13 corresponding to the plurality of first detection electrodes 12 are disposed, and a plurality of rectangular first external connection terminals 14 corresponding to the plurality of first detection electrodes 12 are arranged and formed in the first direction D1 in the vicinity of an edge portion 11A of the insulating substrate 11.

The corresponding first lead wires 13 are respectively connected to the first detection electrodes 12 at one end portion, and the first lead wires 13 are connected to the corresponding first external connection terminals 14 at the other end portion. At this time, out of the plurality of first lead wires 13, some of the first lead wires 13 are respectively connected to the corresponding first external connection terminals 14 at the other end portions in the second direction D2 from the edge portion 11A side of the insulating substrate 11.

Meanwhile, the remaining first lead wires 13 are respectively connected to the corresponding first external connection terminals 14 at the other end portion in the second direction D2 from the side opposite to the edge portion 11A side.

In addition, on the rear surface of the insulating substrate 11, a plurality of second detection electrodes 21 which respectively extend in the second direction D2 and are arranged in parallel in the first direction D1 are formed, a plurality of second lead wires 22 corresponding to the plurality of second detection electrodes 21 are disposed, and a plurality of rectangular second external connection terminals 23 corresponding to the plurality of second detection electrodes 21 are arranged and formed in the first direction D1 in the vicinity of the edge portion 11A of the insulating substrate 11.

The corresponding second lead wires 22 are respectively connected to the second detection electrodes 21 at one end portion, and the second lead wires 22 are connected to the corresponding second external connection terminals 23 at the other end portion. At this time, out of the plurality of second lead wires 22, some of the second lead wires 22 are respectively connected to the corresponding second external connection terminals 23 at the other end portions in the second direction D2 from the edge portion 11A side of the insulating substrate 11.

Meanwhile, the remaining second lead wires 22 are respectively connected to the corresponding second external connection terminals 23 at the other end portion in the second direction D2 from the side opposite to the edge portion 11A side.

On the front surface of the conductive film for a touch panel 1, a band-like first anisotropic conductive membrane 3 is disposed so as to traverse the plurality of first external connection terminals 14 in the first direction D1. The length of the first anisotropic conductive membrane 3 in the second direction D2 is set to be a smaller value than the lengths of the respective first external connection terminals 14 in the second direction D2.

On the rear surface of the conductive film for a touch panel 1 as well, a band-like second anisotropic conductive membrane 4 is disposed so as to traverse the plurality of second external connection terminals 23 in the first direction D1. The length of the second anisotropic conductive membrane 4 in the second direction D2 is, similar to the first anisotropic conductive membrane 3, set to be a smaller value than the lengths of the respective second external connection terminals 23 in the second direction D2.

In addition, a flexible circuit board 5 having flexibility is disposed on the front surface of the conductive film for a touch panel 1 so as to overlap the front surface. The flexible circuit board 5 covers the plurality of first external connection terminals 14 and the first anisotropic conductive membrane 3.

Similarly, on the rear surface of the conductive film for a touch panel 1 as well, a flexible circuit board, not illustrated, is disposed so as to cover the plurality of second external connection terminals 23 and the second anisotropic conductive membrane 4.

Here, the first anisotropic conductive membrane 3 in the present invention is made of an anisotropic conductive material exhibiting adhesiveness by thermal compression and conductivity in the thickness direction and is provided in order to connect the plurality of first external connection terminals 14 in the conductive film for a touch panel 1 and a plurality of circuit-side terminals, not illustrated, in the flexible circuit board 5. In addition, the second anisotropic conductive membrane 4 also has the same function as the first anisotropic conductive membrane 3.

The conductive film for a touch panel 1, the first anisotropic conductive membrane 3, and the flexible circuit board 5 are thermally compressed in the thickness direction so as to be joined together. Therefore, the first external connection terminals 14 in the conductive film for a touch panel 1 and the corresponding circuit-side terminals in the flexible circuit board 5 are electrically connected to each other through the first anisotropic conductive membrane 3.

Figure 2:
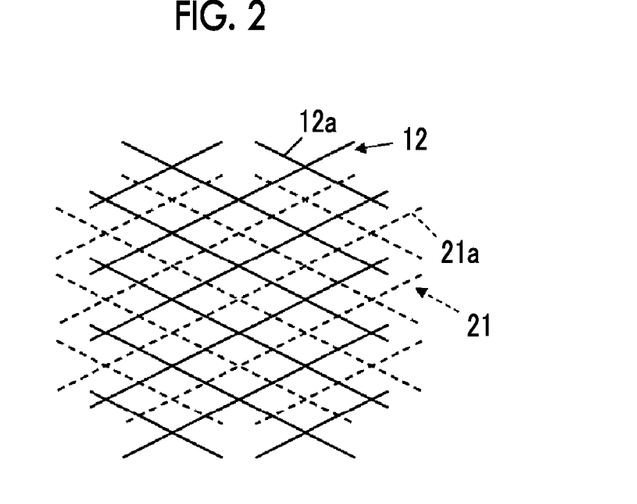
FIG. 2 is a partial plan view illustrating a detection electrode in the conductive film for a touch panel.

As illustrated in FIG. 2, the first detection electrode 12 disposed on the front surface of the insulating substrate 11 is preferably formed of a mesh pattern made of thin metal wires 12a, and the second detection electrode 21 disposed on the rear surface of the insulating substrate 11 is preferably formed of a mesh pattern made of thin metal wires 21a. The method for forming these mesh patterns is not particularly limited, and the mesh patterns can be formed using, for example, a silver salt method. In addition, the materials for the thin metal wires 12a and the thin metal wires 21a are not particularly limited as long as the materials have desired conductivity, and the thin metal wires can be formed of, for example, at least one of gold, silver, or copper.

Figure 3:
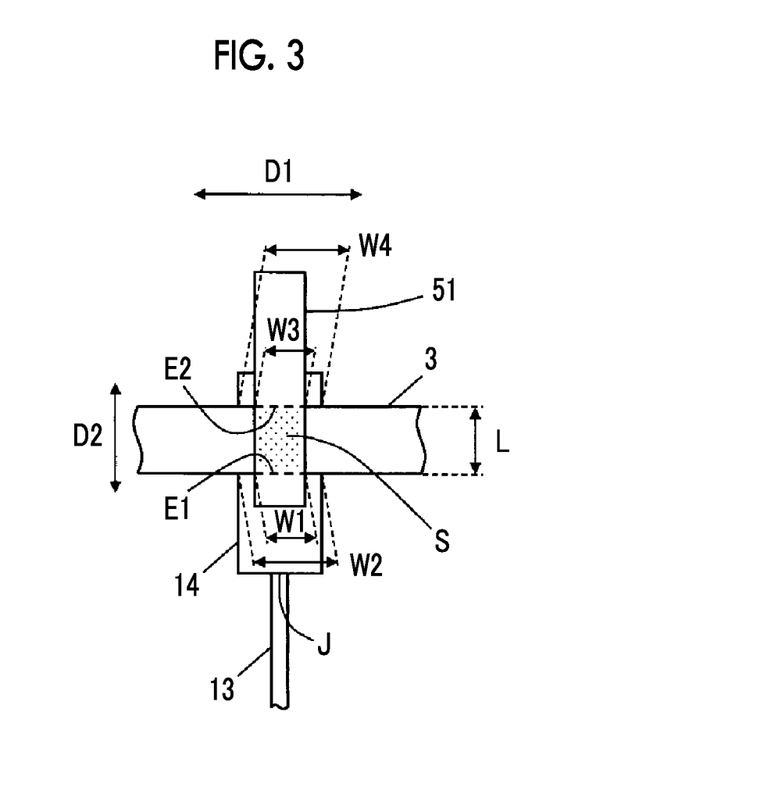
FIG. 3 is a plan view lustrating an appearance in which one first external connection terminal in the conductive film for a touch panel and one circuit-side terminal in a flexible circuit board are connected to each other through a first anisotropic conductive membrane.

FIG. 3 illustrates an appearance in which one first external connection terminal 14 in the conductive film for a touch panel 1 and one circuit-side terminal 51 in the flexible circuit board 5 are connected to each other through the first anisotropic conductive membrane 3. The first anisotropic conductive membrane 3 is disposed so as to traverse the first external connection terminals 14 in the conductive film for a touch panel 1 in the first direction D1, and the rectangular circuit-side terminal 51 in the flexible circuit board 5 extends in the second direction D2 and is disposed so that the first anisotropic conductive membrane 3 and some of the first external connection terminal 14 overlap each other.

An overlapping region S between the first anisotropic conductive membrane 3 and the circuit-side terminal 51 has a first end portion E1 and a second end portion E2 in the second direction D2. Out of these end portions E1 and E2, the first end portion E1 is located on a connection portion J side between the first external connection terminal 14 and the first lead wire 13 and has a first width W1 in the first direction D1. In addition, the first external connection terminal 14 has a second width W2 in the first direction D1 at a location at which the first end portion E1 overlaps the first external connection terminal. In addition, the first width W1 is set to be a smaller value than the second width W2.

Similarly, out of these end portions E1 and E2, the second end portion E2 is located on the side opposite to the connection portion J side and has a third width W3 in the first direction D1. In addition, the first external connection terminal 14 has a fourth width W4 in the first direction D1 at a location at which the second end portion E2 overlaps the first external connection terminal. In addition, the third width W3 is set to be a smaller value than the fourth width W4.

Meanwhile, in Embodiment 1, since the circuit-side terminals 51 and the first external connection terminals 14 are all rectangular, the first width W1 is equal to the third width W3, and, similarly, the second width W2 is equal to the fourth width W4.

Figure 4:
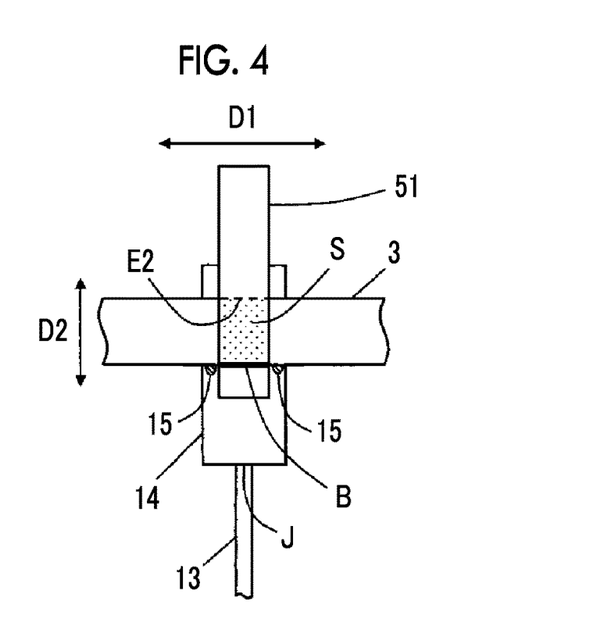
FIG. 4 is a plan view illustrating an aspect of a broken portion in the external connection terminal.

In the overlapping region S, since the first external connection terminal 14, the first anisotropic conductive membrane 3, and the circuit-side terminal 51 overlap one another, a particularly large pressure applies thereto in the case of thermal compression. Therefore, the pressure does not evenly apply to the entire surface of the overlapping region S, and, for example, in a case in which a larger pressure applies to the first end portion E1 than to the second end portion E2, a large shear force applies to the first external connection terminal 14 from the corresponding end portion of the first anisotropic conductive membrane 3. At this time, there are cases in which the conductive film for a touch panel 1 and the plurality of first external connection terminals 14 deform and, as illustrated in FIG. 4, a broken portion B is generated in a part of the first external connection terminal 14.

Meanwhile, in a case in which the thickness of the insulating substrate 11 in the conductive film for a touch panel 1 is set to a small value, the conductive film for a touch panel 1 is likely to deform, and the above-described breakage is likely to be caused more often.

Figure 5:
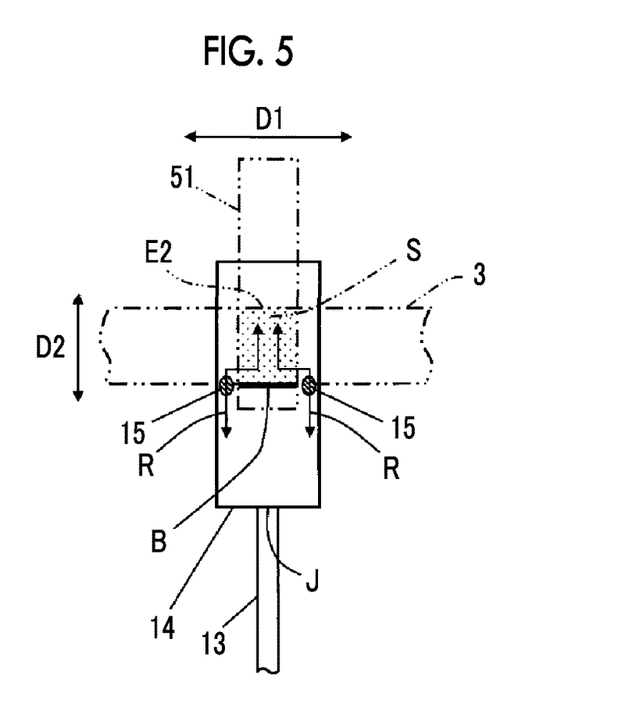
FIG. 5 is a plan view illustrating an aspect of channels of electric currents for the external connection terminal.

However, even when the above-described broken portion B is generated, the first width W1 of the first end portion E1 is smaller than the second width W2 of the first external connection terminal 14, and thus the first external connection terminal 14 has surviving portions 15, which do not break, on both sides of the broken portion B in the first direction D1. Therefore, as illustrated in FIG. 5, channels R of electric currents which run from the circuit-side terminal 51 to a connection portion J with the first lead wire 13 through the first anisotropic conductive membrane 3 and the first external connection terminal 14 in the overlapping region S and the surviving portions 15 are ensured. Therefore, even when the broken portion B is generated in the first external connection terminal 14, the first lead wire 13 and the circuit-side terminal 51 are electrically connected to each other.

In addition, in the case of thermal compression, in a case in which a larger pressure applies to the first end portion E1 side than to the second end portion E2 side in the overlapping region S, it can be considered that the first external connection terminal 14 breaks not only in a location overlapping the first end portion E1 but the first external connection terminal 14 also breaks in locations overlapping end portions of the circuit-side terminal 51 adjacent to the first end portion E1 in the second direction D2.

However, even in this case, since the first external connection terminal 14 does not break in a location overlapping the second end portion E2, the channels R of electric currents from the circuit-side terminal 51 through the first lead wire 13 are ensured.

On the other hand, even when a larger pressure applies to the second end portion E2 than to the first end portion E1 in the overlapping region S, and thus the external connection terminal 14 breaks in the location overlapping the second end portion E2, the second end portion E2 is located on the side opposite to the connection portion J with the first lead wire 13 out of the pair of end portions E1 and E2 of the first anisotropic conductive membrane 3, the channels R of electric currents from the circuit-side terminal 51 through the first lead wire 13 are ensured regardless of breakage.

Figure 6:
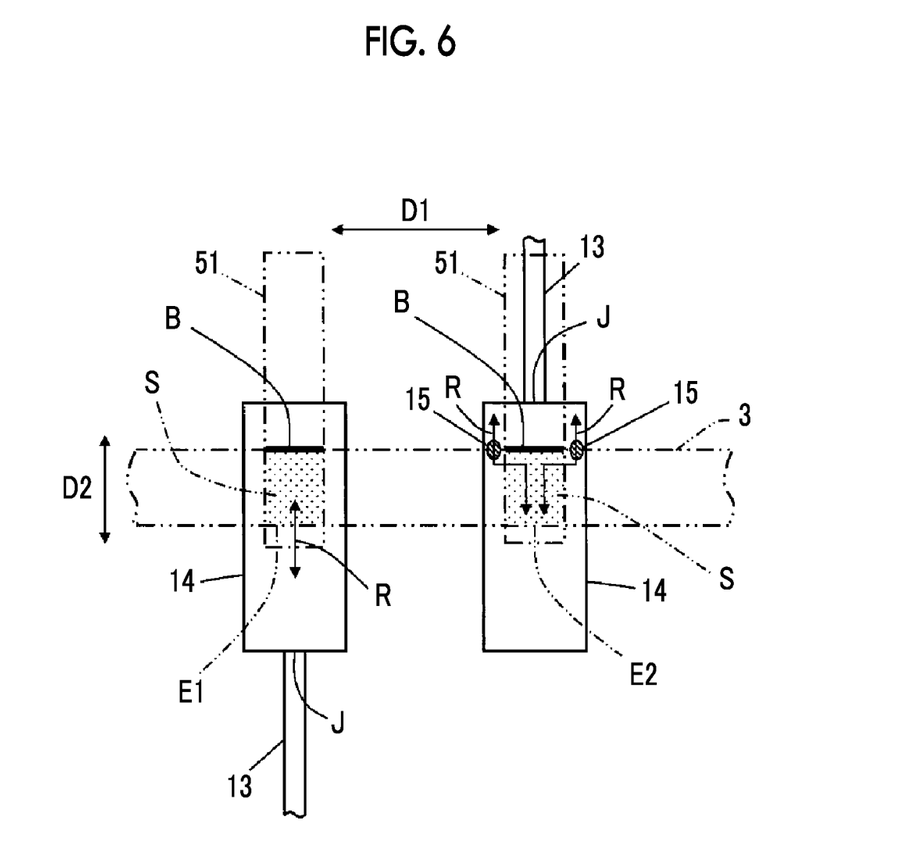
FIG. 6 is a plan view illustrating an aspect of channels of electric currents for two adjacent external connection terminals.

As illustrated in FIG. 6, the plurality of connection portions J between the first external connection terminals 14 and the plurality of lead wires 13 are alternately disposed in the second direction D2, and, out of the pair of end portions E1 and E2 of the first anisotropic conductive membrane 3 in the overlapping region S, the first width W1 of the first end portion E1 located on the connection portion J side between the first external connection terminal 14 and the first lead wire 13 is set to be smaller than the width W2 of the first external connection terminal 14 at the location overlapping the first end portion E1. Therefore, even when a pressure unevenly applies to all of a pair of side ends of the first anisotropic conductive membrane 3 traversing the plurality of first external connection terminals 14, and the first external connection terminal 14 breaks respectively at both side ends, the channels R of electric currents from the circuit-side terminal 51 through the first lead wire 13 are ensured in all of the first external connection terminals 14. Therefore, the first lead wire 13 and the circuit-side terminal 51 are electrically connected to each other.

Meanwhile, even when the broken portion B is generated in the first external connection terminal 14 due to a shear force from the second end portion E2 in the overlapping region S illustrated in FIG. 3, the width W3 of the second end portion E2 is set to be a smaller value than the width W4 of the first external connection terminal 14 at the location overlapping the second end portion E2, and thus the first external connection terminal 14 has the surviving portions 15 on both sides of the broken portion B. Therefore, even when the connection portion J with the first lead wire 13 is disposed in any location of the first external connection terminal 14, the channels R of electric currents are ensured after thermal compression, and the first lead wire 13 and the circuit-side terminal 51 are electrically connected to each other.

Here, in a case in which the length of the first anisotropic conductive membrane 3 illustrated in FIG. 3 in the second direction D2 is represented by L, the area of the overlapping region S is represented by A1, and the area of a region in which the first anisotropic conductive membrane 3 and the first external connection terminal 14 overlap each other is represented by A2, the ratio (A1/A2) is represented by (A1/A2)=((W1+W3)×L/2)/((W2+W4)×L/2), and the ratio (A1/A2) is preferably 95% to 20%, more preferably 90% to 35%, and most preferably 85% to 50%.

Meanwhile, when ratio (A1/A2) is too small, the area of the first anisotropic conductive membrane 3 for conducting the first external connection terminal 14 and the circuit-side terminal 51 becomes insufficient, the first external connection terminal 14 and the circuit-side terminal 51 cannot be electrically connected to each other, and thus the ratio (A1/A2) is desirably at least 20%.

As described above, when the terminal connection structure of the conductive film for a touch panel according to Embodiment 1 is used, it is possible to obtain the reliable electric connection between the conductive film for a touch panel 1 and the flexible circuit board 5 through the first anisotropic conductive membrane 3 regardless of the thickness of the insulating substrate 11 in the conductive film for a touch panel 1 or the locations of the plurality of connection portions J between the first external connection terminals 14 and the first lead wires 13.

In addition, also in the rear surface of the insulating substrate 11 illustrated in FIG. 1, the plurality of second external connection terminals 23 in the conductive film for a touch panel 1, the second anisotropic conductive membrane 4, and the plurality of circuit-side terminals in the flexible circuit board, not illustrated, have the same relationship as that among the plurality of first external connection terminals 14, the first anisotropic conductive membrane 3, and the plurality of circuit-side terminals 51 in the flexible circuit board 5 on the front surface of the insulating substrate 11, it is possible to obtain the reliable electric connection between the conductive film for a touch panel 1 and the flexible circuit board, not illustrated, through the second anisotropic conductive membrane 4.

Meanwhile, the first external connection terminals 14, the second external connection terminals 23, the first lead wires 13, and the second lead wires 22 are respectively formed of metal, and the kind of the metal is not particularly limited as long as the metal has desired conductivity.

The thicknesses of the respective first external connection terminals 14 are preferably 0.05 to 5 µm and most preferably 0.1 to 2 µm in order to decrease the level difference with the insulating substrate 11. The intervals between the first external connection terminals 14 adjacent to each other are preferably 1,000 µm or less, more preferably 500 µm or less, and most preferably 200 µm or less in order to save spaces. Furthermore, the widths of the respective first external connection terminals 14 in the first direction D1 are preferably 1,000 µm or less, more preferably 500 µm or less, and most preferably 200 µm or less in order to save spaces. However, when the widths are excessively narrow, it becomes impossible to obtain an area necessary for the electrical connection with the first anisotropic conductive membrane 3 after thermal compression, and thus the widths are preferably at least 50 µm. What has been described above is also true for the respective second external connection terminals 23.

The material of the insulating substrate 11 in the conductive film for a touch panel 1 is not particularly limited as long as the material is capable of supporting the plurality of first detection electrodes 12 and the plurality of second detection electrodes 21, but is preferably a transparent plastic film that is preferable for conductive films for touch panels. In addition, the thickness of the insulating substrate 11 is not particularly limited as long as the insulating substrate is capable of supporting the plurality of first detection electrodes 12 and the plurality of second detection electrodes 21, but is preferably 100 µm or less and more preferably 50 µm or less in consideration of material costs.

The material of the first anisotropic conductive membrane 3 is not particularly limited as long as the material has desired conductivity, but is desirably a material that can be used at 170° C. or lower, more preferably a material that can be used at 150° C. or lower, and most preferably a material that can be used at 130° C. or lower in order to prevent the deformation of the conductive film for a touch panel 1 and the flexible circuit board 5 by heat in the case of thermal compression. In addition, the thickness of the first anisotropic conductive membrane 3 is preferably 30 µm or less and most preferably 20 µm or less in order to decrease the level difference with the first external connection terminals 14 and the circuit-side terminals 51. What has been described above is also true for the second anisotropic conductive membrane 4.

The material of the flexible circuit board 5 is not particularly limited as long as the material has desired flexibility. The thicknesses of the circuit-side terminals 51 in the flexible circuit board 5 are preferably 60 µm or less and more preferably 40 µm or less in order to prevent the deformation of the conductive film for a touch panel 1 in the case of thermal compression.

In addition, in Embodiment 1, the plurality of first detection electrodes 12, the first lead wires 13, and the first external connection terminals 14 are disposed on the front surface of the insulating substrate 11, and the plurality of second detection electrodes 21, the second lead wires 22, and the second external connection terminals 23 are disposed on the rear surface of the insulating substrate 11, but the constitution is not limited thereto.

For example, it is also possible to employ a constitution in which the plurality of first detection electrodes 12 and the plurality of second detection electrodes 21 are disposed through an interlaminar insulating membrane on one surface side of the insulating substrate 11, the first lead wires 13 and the second lead wires 22 are disposed on the same surface side of the insulating substrate 11, and furthermore, the first external connection terminals 14 and the second external connection terminals 23 are disposed.

In addition, it is also possible to employ a constitution in which two substrates are provided. That is, it is also possible to employ a constitution in which the plurality of first detection electrodes 12, the first lead wires 13, and the first external connection terminals 14 are disposed on the front surface of a first insulating substrate, the plurality of second detection electrodes 21, the second lead wires 22, and the second external connection terminals 23 are disposed on the front surface of a second insulating substrate 11, and the first insulating substrate and the second insulating substrate are used in a state of being overlapped with each other.

Embodiment 2

Figure 7:
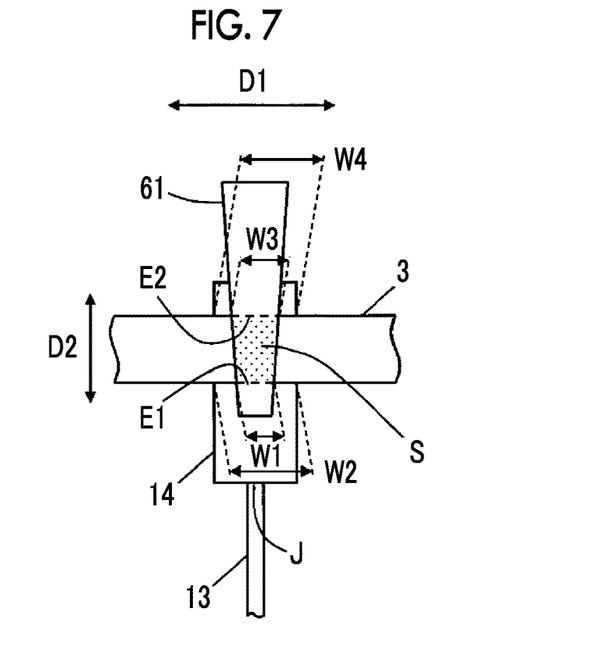
FIG. 7 is a plan view of a terminal connection structure of a conductive film for a touch panel according to Embodiment 2.

In Embodiment 1, the circuit-side terminal 51 has a rectangular shape as illustrated in FIG. 3, but the circuit-side terminal does not necessarily need to have a rectangular shape and may have a trapezoidal shape as illustrated in FIG. 7.

Even when a circuit-side terminal 61 has a trapezoidal shape as described above, the first width W1 of the first end portion E1 in the overlapping region S is set to be a smaller value than the second width W2 of the first external connection terminal 14, and thus, even when the broken portion B is generated in the first external connection terminal 14 in the case of thermal compression, the first external connection terminal 14 has the surviving portions 15, and the channels R of electric currents are ensured, and thus the first lead wire 13 and the circuit-side terminal 61 are electrically connected to each other.

In addition, the third width W3 of the second end portion E2 is set to be a smaller value than the fourth width W4 of the first external connection terminal 14, and thus, even when the connection portion J with the first lead wire 13 is disposed in any location of the first external connection terminal 14, the first lead wire 13 and the circuit-side terminal 61 are electrically connected to each other regardless of breakage caused in the first external connection terminal 14 in the case of thermal compression.

Embodiment 3

Figure 8:
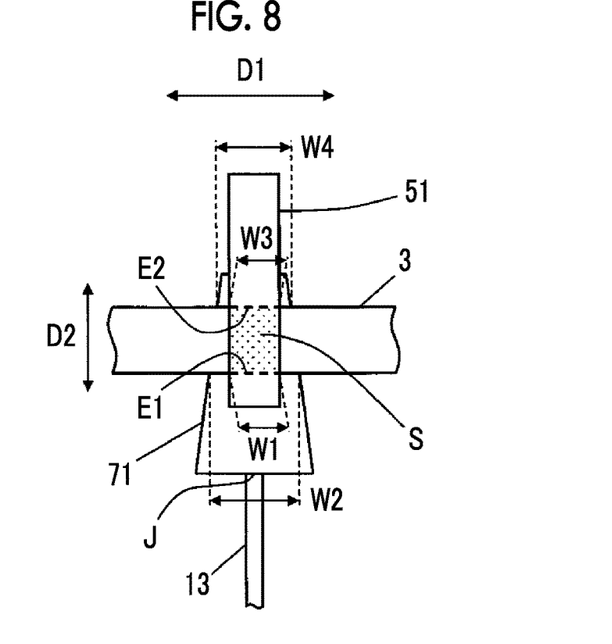
FIG. 8 is a plan view of a terminal connection structure of a conductive film for a touch panel according to Embodiment 3.

In Embodiment 1, the first external connection terminal 14 has a rectangular shape as illustrated in FIG. 3, but the first external connection terminal does not necessarily need to have a rectangular shape and may have a trapezoidal shape as illustrated in FIG. 8.

Even when a first external connection terminal 71 has a trapezoidal shape as described above, the first width W1 of the first end portion E1 is set to be a smaller value than the second width W2 of the first external connection terminal 71, and thus the first external connection terminal 71 has the surviving portions 15 in the case of thermal compression, and the channels R of electric currents are ensured, and thus the first lead wire 13 and the circuit-side terminal 51 are electrically connected to each other.

In addition, the third width W3 of the second end portion E2 is set to be a smaller value than the fourth width W4 of the first external connection terminal 71, and thus the first external connection terminal 71 has the surviving portions 15 in the case of thermal compression, and the channels R of electric circuits are ensured, and thus, even when the connection portion J with the first lead wire 13 is disposed in any location of the first external connection terminal 71, the first lead wire 13 and the circuit-side terminal 51 are electrically connected to each other regardless of breakage caused in the first external connection terminal 71 in the case of thermal compression.

Meanwhile, the shape of the first external connection terminal 71 is not particularly limited to a rectangular shape or a trapezoidal shape as long as the first external connection terminal has desired conductivity and may be a comb shape or a wedge shape.

Embodiment 4

Figure 9:
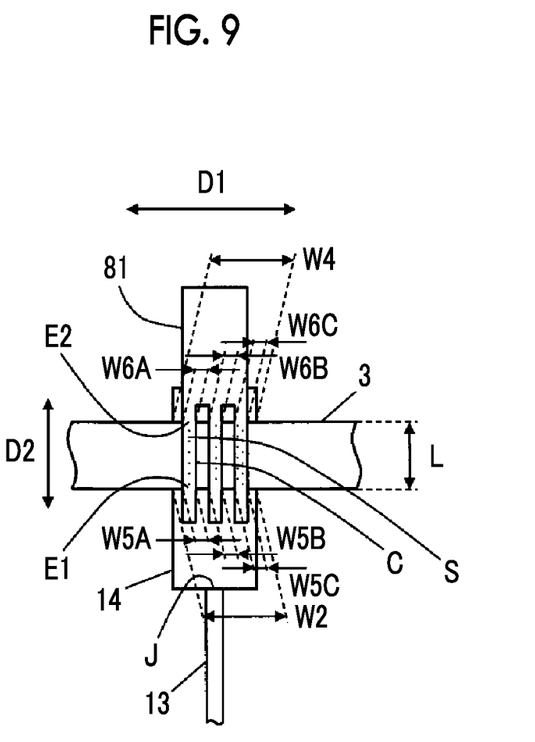
FIG. 9 is a plan view of a terminal connection structure of a conductive film for a touch panel according to Embodiment 4.

In Embodiment 1, the circuit-side terminal 51 has a rectangular shape as illustrated in FIG. 3, but the circuit-side terminal does not necessarily need to have a rectangular shape and may have a comb shape having a plurality of terminal-branching portions C extending in the second direction D2 as illustrated in FIG. 9.

Each of the plurality of overlapping regions S foluied by the plurality of terminal-branching portions C of a circuit-side terminal 81 and the first anisotropic conductive membrane 3 has the plurality of first end portions E1 and the second end portions E2 in the second direction D2. The respective first end portions E1 are arranged in the first direction D1, are located on the connection portion J side between the first external connection terminal 14 and the first lead wire 13, and have first branch widths W5A, W5B, and W5C in the first direction D1.

In addition, the sum W5 of the first branch widths W5A, W5B, and W5C is set to be a smaller value than the second width W2.

In addition, the respective second end portions E2 are arranged in the first direction D1, are located on the side opposite to the connection portion J side between the first external connection terminal 14 and the first lead wire 13, and have second branch widths W6A, W6B, and W6C in the first direction D1.

In addition, the sum W6 of the second branch widths W6A, W6B, and W6C is set to be a smaller value than the fourth width W4.

Even when the circuit-side terminal 81 has a comb shape having the plurality of terminal-branching portions C as described above, the sum W5 of the first branch widths W5A, W5B, and W5C in the plurality of overlapping regions S is set to be a smaller value than the second width W2 of the first external connection terminal 14, and thus, similar to Embodiments 1 to 3, regardless of breakage caused in the first external connection terminal 14 in the case of thermal compression, the first external connection terminal 14 has the surviving portions 15, and the channels R of electric currents are ensured, and thus the first lead wire 13 and the circuit-side terminal 81 are electrically connected to each other.

In addition, the sum W6 of the second branch widths W6A, W6B, and W6C is set to be a smaller value than the fourth width W4 of the first external connection terminal 14, and thus, similar to Embodiments 1 to 3, even when the connection portion J with the first lead wire 13 is disposed in any location of the first external connection terminal 14, the first lead wire 13 and the circuit-side terminal 81 are electrically connected to each other regardless of breakage caused in the first external connection terminal 14 in the case of thermal compression.

Here, in a case in which the length of the first anisotropic conductive membrane 3 in the second direction D2 is represented by L, and the sum of the areas of the plurality of overlapping regions S is represented by A3, the area A3 is represented by $A3=((W5A+W6A)+(W5B+W6B)+(W5C+W6C))\times L/2$, and the ratio (A3/A2) to A2 which represents the area of the region in which the first anisotropic conductive membrane 3 and the first external connection terminal 14 overlap each other preferably reaches 95% to 20%, more preferably reaches 90% to 35%, and most preferably reaches 85% to 50%.

In addition, when the terminal connection structures of the conductive films for a touch panel according to Embodiments 1 to 4 are applied to touch panels, it is possible to reliably electrically connect conductive films for touch panels, anisotropic conductive membranes, and flexible circuit boards which are embedded in the touch panels.

The method for manufacturing the conductive film for a touch panel which is used in the above-described terminal connection structures of a conductive film for a touch panel is not particularly limited, and examples thereof include a method having a step (1) of forming silver halide emulsion layers containing a silver halide and a binder, that is, photosensitive layers on both surfaces of the insulating substrate 11 respectively and a step (2) of exposing and then developing the photosensitive layers.

Hereinafter, the respective steps will be described.

<Step (1): Step of Forming Photosensitive Layers>

Step (1) is a step of forming photosensitive layers containing a silver halide and a binder on both surfaces of the insulating substrate 11.

The method for forming the photosensitive layers is not particularly limited, but a method in which a composition for forming the photosensitive layers which contains a silver halide and a binder is brought into contact with the insulating substrate 11 and photosensitive layers are formed on both surfaces of the insulating substrate 11 is preferred from the viewpoint of productivity.

Hereinafter, an aspect of the composition for forming the photosensitive layers which is used in the above-described method will be described in detail, and then the order of the step will be described in detail.

To the composition for forming the photosensitive layers, a silver halide and a binder are added.

A halogen element contained in the silver halide may be any one of chlorine, bromine, iodine, and fluorine or a combination thereof. As the silver halide, for example, a silver halide mainly containing silver chloride, silver bromide, or silver iodide is preferably used, and furthermore, a silver halide mainly containing silver bromide or silver chloride is preferably used.

The kind of the binder being used is not particularly limited, a well-known macromolecule can be used, and, for example, a water-soluble binder (water-soluble macromolecule) may be used. Specific examples thereof include polysaccharides such as gelatin, carrageenan, polyvinyl alcohol (PVA), polyvinylpyrrolidone (PVP), and starch, cellulose and derivatives thereof, polyethylene oxide, polysaccharides, polyvinylamines, chitosan, polylysines, polyacrylic acids, polyalginic acids, polyhyaluroanic acids, carboxy cellulose, gum arabic, alginate sodium, and the like. In addition, the binder may be included in the composition for forming the photosensitive layers in a latex form.

To the composition for forming the photosensitive layers, a solvent is added.

Examples of the solvent being used include water, organic solvents (for example, alcohols such as methanol, ketones such as acetone, amides such as formamide, sulfoxides such as dimethyl sulfoxide, esters such as ethyl acetate, ethers, and the like), ionic liquids, and solvent mixtures thereof.

(Order of Step)

The method for bringing the composition for forming the photosensitive layers into contact with the insulating substrate 11 is not particularly limited, and a well-known method can be employed. Examples thereof include a method in which the composition for forming the photosensitive layers is applied to the insulating substrate 11, a method in which the insulating substrate 11 is immersed in the composition for forming the photosensitive layers, and the like.

Meanwhile, a protective layer made of the binder may be further provided on the photosensitive layer as necessary. The provision of the protective layer prevents scratches or improves dynamic characteristics.

<Step (2): Exposure and Development Step>

Step (2) is a step of exposing and then developing the patterns of the photosensitive layers obtained in Step (1), thereby forming the first detection electrodes 12, the first lead wires 13, the first external connection terminals 14, the second detection electrodes 21, the second lead wires 22, and the second external connection terminals 23.

First, hereinafter, a pattern exposure treatment will be described in detail, and then a development treatment will be described in detail.

(Pattern Exposure)

When a pattern on the photosensitive layer is exposed, the silver halide in the photosensitive layer forms latent images in exposed regions. The regions in which the latent images are formed form thin metal wires when a development treatment described below is carried out thereon. On the other hand, in non-exposed regions which are not exposed, the silver halide dissolves and flows out from the photosensitive layer in the case of a fixation treatment described below, and transparent films are obtained.

A light source that is used in the case of exposure is not particularly limited, and examples thereof include light such as visible light rays and ultraviolet rays, radiant rays such as X-rays, and the like.

The method for exposing the patterns is not particularly limited, and, for example, the patterns may be exposed by means of surface exposure using photo masks or scanning exposure using laser beams. Meanwhile, the shape of the pattern is not particularly limited and is appropriately adjusted to the pattern of thin metal wires that need to be formed.

(Development Treatment)

The method for the development treatment is not particularly limited, and a well-known method can be employed. For example, it is possible to use ordinary development treatment techniques that are used for silver halide photographic films, printing paper, films for making printing plates, emulsion masks for photo masks, and the like.

The kind of a developer that is used in the case of the development treatment is not particularly limited, and, for example, PQ developers, MQ developers, MAA developers, and the like can also be used. Examples of commercially available products thereof include developers such as CN-16, CR-56, CP45X, FD-3, and PAPITOL manufactured by Fujifilm Corporation, C-41, E-6, RA-4, D-19, D-72 manufactured by KODAK Company, and the like and developers included in kits thereof. In addition, it is also possible to use lith developers.

The development treatment may include the fixation treatment which is intended to remove silver salts in the non-exposed portions and stabilize the non-exposed portions. For the fixation treatment, it is possible to use techniques of fixation treatments that are used for silver halide photographic films, developing paper, films for making printing plates, emulsion masks for photo masks and the like.

In addition to the above-described steps, an undercoat formation step, an antihalation layer formation step, which are described below, a heating treatment, or a debinding treatment may be carried out as necessary.

(Undercoat Formation Step)

Before Step (1), a step of forming an undercoat including the predetermined compound described above on the front surface of the insulating substrate 11 is preferably carried out since the adhesiveness between the insulating substrate 11 and the silver halide emulsion layers becomes excellent.

(Antihalation Layer Formation Step)

From the viewpoint of thinning the thin metal wires 12a and 21a, before Step (1), a step of forming antihalation layers on both surfaces of the insulating substrate 11 is preferably carried out.

EXAMPLES

Hereinafter, the present invention will be described in more detail on the basis of examples. Materials, amounts used, proportions, processing contents, processing orders, and the like described below can be appropriately modified within the scope of the gist of the present invention, and the scope of the present invention is not restrictively interpreted by the following examples.

Example 1

(Preparation of Silver Halide Emulsion)

To Liquid 1 that had been stored at 38° C. and a pH of 4.5, 90% (in terms of the amount) of Liquid 2 and Liquid 3 were respectively added at the same time for 20 minutes under stirring, thereby forming 0.16 μm nuclear particles. Subsequently, Liquid 4 and Liquid 5 were added thereto for eight minutes, and furthermore, the remaining 10% of Liquid 2 and Liquid 3 were added for two minutes, thereby growing the nuclear particles to 0.21 μm. Furthermore, potassium iodide (0.15 g) was added thereto, and the mixture was aged for five minutes, thereby completing the formation of the particles.

| Liquid 1: | |
| --- | --- |
| Water | 750 ml |
| Gelatin | 9 g |
| Sodium chloride | 3 g |
| 1,3-Dimethylimidazolidine-2-thione | 20 mg |
| Sodium benzenethiosulfate | 10 mg |
| Citric acid | 0.7 g |
| Liquid 2: | |
| Water | 300 ml |
| Silver nitrate | 150 g |
| Liquid 3: | |
| Water | 300 ml |
| Sodium chloride | 38 g |
| Potassium bromide | 32 g |
| Potassium hexachloroiridate (III) (0.005% of KCl and 20% of an aqueous solution) | 8 ml |
| Ammonium hexachlororhodate (0.001% of NaCl and 20% of an aqueous solution) | 10 ml |
| Liquid 4: | |
| Water | 100 ml |
| Silver nitrate | 50 g |
| Liquid 5: | |
| Water | 100 ml |
| Sodium chloride | 13 g |
| Potassium bromide | 11 g |
| Yellow prussiate of potash | 5 mg |

After that, the particles were washed with water using a flocculation method according to an ordinary method. Specifically, the temperature was lower to 35° C., and the pH was lowered until silver halides sedimented using sulfuric acid (the pH was in a range of 3.6±0.2). Next, approximately three liters of the supernatant solution was removed (first water washing). Furthermore, three liters of distilled water was added thereto, and then sulfuric acid was added thereto until the silver halides sedimented. Again, three liters of the supernatant solution was removed (second water washing). The same operation as the second water washing was repeated one more time (third water washing), thereby completing a water washing and desalination step. The emulsion after water washing and desalination was adjusted to a pH of 6.4 and a pAg of 7.5, gelatin (3.9 g), sodium benzenethiosulfate (10 mg), sodium benzenethiosulfinate (3 mg), sodium thiosulfate (15 mg), and chlorauric acid (10 mg) were added thereto, chemical sensitization was carried out at 55° C. so as to obtain an optimal sensitivity, and 1,3,3a,7-tetraazaindene (100 mg) as a stabilizer and PROXEL (trade name, manufactured by ICI Co., Ltd.) (100 mg) as a preservative were added thereto. The finally-obtained emulsion was a silver iodobromide cubic particle emulsion which included silver iodide (0.08 mol %) and silver chlorobroinide in which the proportions of silver chloride and silver bromide were set to 70 mol % and 30 mol % and had an average particle diameter of 0.22 μm and a coefficient of variation of 9%.

(Preparation of Composition for Forming Photosensitive Layer)

To the emulsion, 1,3,3a,7-tetraazaindene ($1.2 \times 10^{-4}$ mol/mol Ag), hydroquinone ($1.2 \times 10^{-2}$ mol/mol Ag), citric acid ($3.0 \times 10^{-4}$ mol/mol Ag), and 2,4-dichloro-6-hydroxy-1,3,5-triazine sodium salt (0.90 g/mol Ag) were added, and the pH of a coating fluid was adjusted to 5.6 using citric acid, thereby obtaining a composition for forming a photosensitive layer.

(Photosensitive Layer Formation Step)

After a corona discharge treatment was carried out on an insulating substrate, 0.1 μm-thick gelatin layers were provided as undercoats on both surfaces of the insulating substrate, and furthermore, antihalation layers which had an optical density of approximately 1.0 and included a dye that was decolored by alkalis in developers were provided on the undercoats. The composition for forming a photosensitive layer was applied onto the antihalation layers, and furthermore, 0.15 μm-thick gelatin layers were provided, thereby obtaining an insulating substrate having a photosensitive layer formed on the front surface. The insulating substrate having the photosensitive layer formed on the front surface was used as Film A. In the formed photosensitive layer, the amount of silver was 6.0 g/m$^2$, and the amount of gelatin was 1.0 g/m$^2$.

(Exposure and Development Step)

The front surface of Film A was exposed to parallel light generated from a high-pressure mercury lamp as a light source through a photo mask corresponding the patterns of the first detection electrodes 12, the first lead wires 13, and the first external connection terminals 14. After the exposure, the front surface was developed using the following developer, and furthermore, a development treatment was carried out using a fixation liquid (trade name: N3X-R for CN16X, manufactured by Fujifilm Corporation). Furthermore, the front surface was rinsed with pure water and dried, thereby obtaining an insulating substrate having conductive members made of Ag lines and gelatin layers on both surfaces. The gelatin layer was formed between the Ag lines. The obtained film was used as Film B.

(Composition of Developer)

| | |
| --- | --- |
| Hydroquinone | 0.037 mol/L |
| N-methylaminophenol | 0.016 mol/L |
| Sodium metaborate | 0.140 mol/L |
| Sodium hydroxide | 0.360 mol/L |
| Sodium bromide | 0.031 mol/L |
| Potassium metabisulfite | 0.187 mol/L |

(Heating Step)

Film B was placed still in an overheating vapor tank at 120° C. for 130 seconds, thereby carrying out a heating treatment. The heated film was used as Film C. Film C is a conductive film for a touch panel.

Figure 10A:
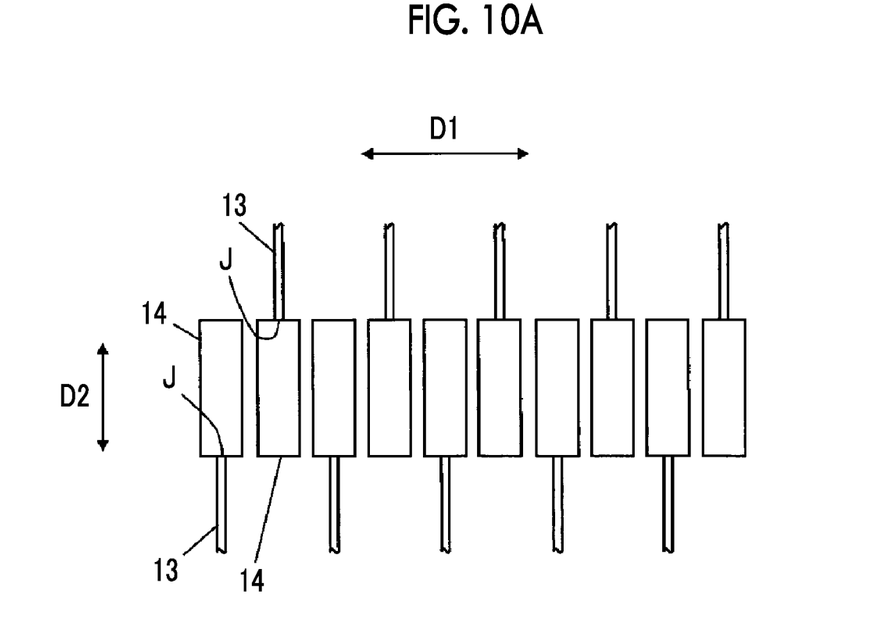
FIGS. 10A and 10B are plan views illustrating a variety of aspects of an external connection terminal in a test piece for a temperature change test.

In the above-described manner, a conductive film for a touch panel in which ten first external connection terminals 14 and ten corresponding first lead wires 13 as illustrated in FIG. 10(A) were arranged and formed in the first direction D1 and the respective first external connection terminals 14 and the first lead wires 13 were alternately connected to each other in the second direction D2 and which was to be used in Example 1 was produced.

Meanwhile, the thickness of the insulating substrate was 40 μm.

In addition, a flexible circuit board was thermally compressed onto the produced conductive film for a touch panel through an anisotropic conductive membrane (CP920CM-25AC manufactured by Dexerials Corporation) at 140° C. and 3 MPa for ten seconds, thereby producing 100 test pieces of Example 1 in which the ten first external connection terminals 14 in the conductive film for a touch panel were connected to ten circuit-side terminals in the flexible circuit board. Meanwhile, regarding the dimensions illustrated in FIG. 3, the first width W1 was set to 0.40 mm, the second width W2 was set to 0.50 mm, the third width W3 was set to 0.50 mm, the fourth width W4 was set to 0.50 mm, the length L of the anisotropic conductive membrane in the second direction D2 was set to 1.5 mm. In addition, the lengths of the respective first external connection terminals 14 in the second direction D2 were set to 4.0 mm. The respective test pieces had the first lead wires 13 corresponding to the ten first external connection terminals 14, and the total number of the first external connection terminals 14 that the 100 test pieces had was 1,000.

On the produced test pieces, 500 cycles of a temperature change test was carried out on the basis of JIS C 60068-2-14 under conditions of 85° C. for ten minutes on the high-temperature side, −40° C. for ten minutes on the low-temperature side, and a temperature change rate of 15° C./minute. After the test, out of a total of 1,000 first external connection terminals 14, the number P of first external connection terminals maintaining a conduction state between the circuit-side terminals in the flexible circuit board and the first lead wires 13 corresponding thereto was counted, and the conduction yield percentage M was calculated from the number P using following calculation equation.

$$M = P/(10 \times 100) \times 100$$

Meanwhile, the number P of the external connection terminals 14 and the first lead wires 13 which were electrically conducted through the connection portions J was measured using M3500A 6½ Digits Standard DMM manufactured by PICOTEST.

Example 2

Test pieces of Example 2 were respectively produced using the same method as in Example 1 except for the fact that the first width W1 was set to 0.08 mm, the second width W2 was set to 0.10 mm, the third width W3 was set to 0.10 mm, and the fourth width W4 was set to 0.10 mm.

Example 3

Test pieces of Example 3 were respectively produced using the same method as in Example 1 except for the fact that the first width W1 was set to 0.40 mm, the second width W2 was set to 0.50 mm, the third width W3 was set to 0.40 mm, and the fourth width W4 was set to 0.50 mm.

Example 4

Test pieces of Example 4 were respectively produced using the same method as in Example 1 except for the fact that the first width W1 was set to 0.08 mm, the second width W2 was set to 0.10 mm, the third width W3 was set to 0.08 mm, and the fourth width W4 was set to 0.10 mm.

Comparative Example 1

Test pieces of Comparative Example 1 were respectively produced using the same method as in Example 1 except for the fact that the first width W1 was set to 0.50 mm, the second width W2 was set to 0.50 mm, the third width W3 was set to 0.50 mm, and the fourth width W4 was set to 0.50 mm.

Comparative Example 2

Figure 10B:
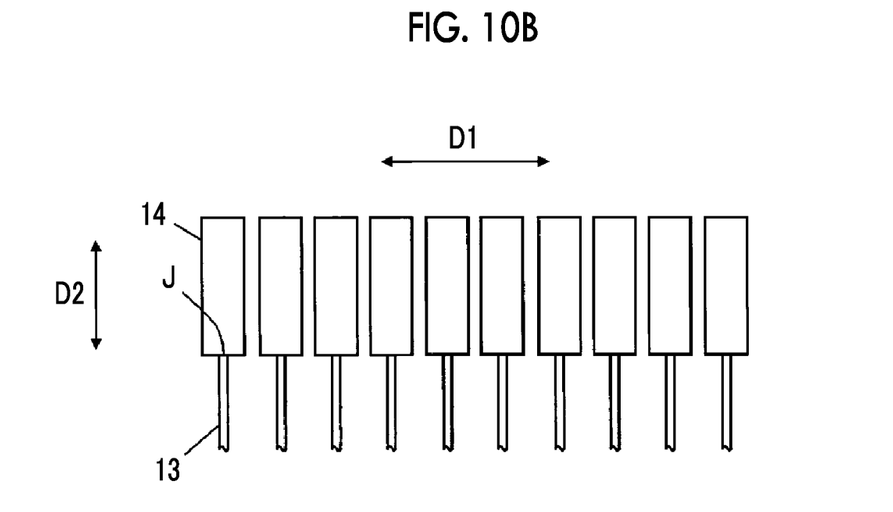

Test pieces of Comparative Example 2 were respectively produced using the same method as in Comparative Example 1 except for the fact that, as illustrated in FIG. 10B, the respective connection portions J between the first external connection terminals 14 and the first lead wires 13 were disposed in the same side in the second direction D2.

Comparative Example 3

Test pieces of Comparative Example 3 were respectively produced using the same method as in Comparative Example 2 except for the fact that the first width W1 was set to 0.10 mm, the second width W2 was set to 0.10 mm, the third width W3 was set to 0.10 mm, and the fourth width W4 was set to 0.10 mm.

After the temperature change tests were carried out on the test pieces of Examples 1 to 4 and Comparative Examples 1 to 3 respectively, the number P of the external connection terminals 14 and the first lead wires 13 which were electrically conducted through the connection portions J was measured, and the conduction yield percentage M was calculated. The results are shown in Table 1.

TABLE 1

|  | First width W1 mm | Second width W2 mm | Third width W3 mm | Fourth width W4 mm | Thickness of insulating substrate μm | Connection portion between terminal and wire J | Conduction yield percentage M % |
|---|---|---|---|---|---|---|---|
| EXAMPLE 1 | 0.40 | 0.50 | 0.50 | 0.50 | 40 | Alternate | 90 |
| EXAMPLE 2 | 0.08 | 0.10 | 0.10 | 0.10 | 40 | Alternate | 80 |
| EXAMPLE 3 | 0.40 | 0.50 | 0.40 | 0.50 | 40 | Alternate | 94 |
| EXAMPLE 4 | 0.08 | 0.10 | 0.08 | 0.10 | 40 | Alternate | 80 |
| COMPARATIVE EXAMPLE 1 | 0.50 | 0.50 | 0.50 | 0.50 | 40 | Alternate | 47 |
| COMPARATIVE EXAMPLE 2 | 0.50 | 0.50 | 0.50 | 0.50 | 40 | On the same side | 60 |
| COMPARATIVE EXAMPLE 3 | 0.10 | 0.10 | 0.10 | 0.10 | 40 | On the same side | 34 |

In Examples 1 to 4 and Comparative Examples 1 to 3, only the first width W1, the second width W2, the third width W3, the fourth width W4, and the locations of the connection portions J in the second direction D were changed while maintaining the thicknesses of the insulating substrates to be constant.

In the test pieces of Examples 1 to 4, the conduction yield percentages M were all 80% or higher. In contrast, in the test pieces of Comparative Examples 1 to 3, the conduction yield percentages M were all 60% or lower.

Since the temperature change tests were carried out in extremely severe environments compared with environments under which touch panels are generally used, the conduction yield percentages M of 80% or higher which were obtained in Examples 1 to 4 indicate that the first external connection terminals 14 in the conductive film for a touch panel and the circuit-side terminals in the flexible circuit board were connected to each other with sufficiently high reliability.

In contrast, in Comparative Examples 1 to 3, the conduction yield percentages M were 60% or lower, and it is assumed that the first external connection terminals 14 in the conductive film for a touch panel and the circuit-side terminals in the flexible circuit board were not reliably connected to each other.

Here, in a case in which Example 1 and Comparative Example 1 were compared with each other, the only difference was that the first width W1 was set to be a smaller value than the second width W2. In addition, the conduction yield percentage M in Example 1 was 43% higher than the conduction yield percentage M in Comparative Example 1. That is, it is considered that, when the first width W1 is set to be a smaller value than the second width W2, the first lead wires 13 and the circuit-side terminals in the flexible circuit board are connected to each other even in the broken first external connection terminals 14.

In addition, in a case in which Comparative Examples 1 and 2 were compared with each other, the only difference was the locations of the plurality of connection portions J between the first external connection terminals 14 and the first lead wires 13. In addition, the conduction yield percentage M in Comparative Example 1 was 13% lower than the conduction yield percentage M in Comparative Example 2. That is, the conduction yield percentage M becomes lower when the locations of the connection portions J are alternate in the second direction D2 compared with when the locations of the connection portions J are on the same side in the second direction D2.

This is considered to be because, in a case in which the first width W1 is set to be the same value as the second width W2, and the connection portions J are alternately disposed in the second direction D2, even when a pressure applies to any one of the pair of end portions of the overlapping region, breakage occurs throughout the entire width of the first external connection terminal 14 in some of the first external connection terminals 14.

EXPLANATION OF REFERENCES

1: conductive film for touch panel
11: insulating substrate
11A: insulated portion in insulating substrate
12: first detection electrode
12a, 21a: thin metal wire
13: first lead wire
14, 71: first external connection terminal
15: surviving portion
21: second detection electrode
22: second lead wire
23: second external connection terminal
3: first anisotropic conductive membrane
4: second anisotropic conductive membrane
5: flexible circuit board
51, 61, 81: circuit-side terminal
E1: first end portion
E2: second end portion
J: connection portion
B: broken portion
C: terminal-branching portion
S: overlapping region
R: channel of electric currents
L: length of first anisotropic conductive membrane in second direction
W1: first width
W2: second width
W3: third width
W4: fourth width
W5A, W5B, W5C: first branch width
W5: sum of first branch widths
W6A, W6B, W6C: second branch width
W6: sum of second branch widths
D1: first direction
D2: second direction

What is claimed is:

1. A terminal connection structure of a conductive film for a touch panel which connects a plurality of external connection terminals in the conductive film for a touch panel to a plurality of circuit-side terminals in a flexible circuit board through an anisotropic conductive membrane,
wherein the plurality of external connection terminals and the plurality of circuit-side terminals are respectively arranged in a first direction and are disposed so as to at least partially overlap each other,
the conductive film for a touch panel has a plurality of detection electrodes and a plurality of lead wires respectively connecting the plurality of detection electrodes to the plurality of external connection terminals,
out of the plurality of external connection terminals, at least two external connection terminals have connection portions with the plurality of lead wires disposed at different locations,
the anisotropic conductive membrane extends in the first direction and is disposed between the plurality of external connection terminals and the plurality of circuit-side terminals, and,
in each of the external connection terminals, an overlapping region between the circuit-side terminal and the anisotropic conductive membrane has a pair of end portions in a second direction orthogonal to the first direction, and, out of the pair of end portions, a width W1 of a first end portion in the first direction being located on a connection portion side between the external connection terminal and the lead wire is smaller than a width W2 in the first direction of the external connection terminal overlapping the first end portion.

2. The terminal connection structure of a conductive film for a touch panel according to claim 1,
wherein, in each of the external connection terminals, out of the pair of end portions, a width W3 of a second end portion in the first direction being located on a side opposite to the connection portion side between the external connection terminal and the lead wire is smaller than a width W4 in the first direction of the external connection terminal overlapping the second end portion.

3. The terminal connection structure of a conductive film for a touch panel according to claim 2,
wherein the plurality of external connection terminals each have a rectangular shape, and,
in the at least two of the plurality of external connection terminals, the plurality of lead wires are connected to mutually different sides of the rectangular shape.

4. The terminal connection structure of a conductive film for a touch panel according to claim 3,
wherein, in the at least two of the plurality of external connection terminals, the lead wires are connected to mutually facing sides of the rectangular shape.

5. The terminal connection structure of a conductive film for a touch panel according to claim 4,
wherein the plurality of circuit-side terminals respectively have a plurality of terminal-branching portions extending in the second direction, and
a sum W5 of widths of the plurality of terminal-branching portions in the first direction in the first end portion is smaller than the width W2 in the first direction of the external connection terminal overlapping the first end portion.

6. The terminal connection structure of a conductive film for a touch panel according to claim 5,
wherein a sum W6 of widths of the plurality of terminal-branching portions in the first direction in the second end portion is smaller than the width W4 in the first direction of the external connection terminal overlapping the second end portion.

7. The terminal connection structure of a conductive film for a touch panel according to claim 3,
wherein the plurality of circuit-side terminals respectively have a plurality of terminal-branching portions extending in the second direction, and
a sum W5 of widths of the plurality of terminal-branching portions in the first direction in the first end portion is smaller than the width W2 in the first direction of the external connection terminal overlapping the first end portion.

8. The terminal connection structure of a conductive film for a touch panel according to claim 7,
wherein a sum W6 of widths of the plurality of terminal-branching portions in the first direction in the second end portion is smaller than the width W4 in the first direction of the external connection terminal overlapping the second end portion.

9. The terminal connection structure of a conductive film for a touch panel according to claim 2,
wherein the plurality of circuit-side terminals respectively have a plurality of terminal-branching portions extending in the second direction, and
a sum W5 of widths of the plurality of terminal-branching portions in the first direction in the first end portion is smaller than the width W2 in the first direction of the external connection terminal overlapping the first end portion.

10. The terminal connection structure of a conductive film for a touch panel according to claim 9,
wherein a sum W6 of widths of the plurality of terminal-branching portions in the first direction in the second end portion is smaller than the width W4 in the first direction of the external connection terminal overlapping the second end portion.

11. The terminal connection structure of a conductive film for a touch panel according to claim 1,
wherein the plurality of external connection terminals each have a rectangular shape, and,
in the at least two of the plurality of external connection terminals, the plurality of lead wires are connected to mutually different sides of the rectangular shape.

12. The terminal connection structure of a conductive film for a touch panel according to claim 11,
wherein, in the at least two of the plurality of external connection terminals, the lead wires are connected to mutually facing sides of the rectangular shape.

13. The terminal connection structure of a conductive film for a touch panel according to claim 1,
wherein the plurality of circuit-side terminals respectively have a plurality of terminal-branching portions extending in the second direction, and
a sum W5 of widths of the plurality of terminal-branching portions in the first direction in the first end portion is smaller than the width W2 in the first direction of the external connection terminal overlapping the first end portion.

14. The terminal connection structure of a conductive film for a touch panel according to claim 13,
wherein a sum W6 of widths of the plurality of terminal-branching portions in the first direction in the second end portion is smaller than the width W4 in the first direction of the external connection terminal overlapping the second end portion.

15. The terminal connection structure of a conductive film for a touch panel according to claim 1,
wherein the conductive film for a touch panel has an insulating substrate having a thickness of 50 μm or less, and the plurality of detection electrodes and the plurality of lead wires are disposed on a front surface of the insulating substrate.

16. The terminal connection structure of a conductive film for a touch panel according to claim 1,
wherein the plurality of detection electrodes are formed of mesh-shaped thin metal wires.

17. The terminal connection structure of a conductive film for a touch panel according to claim 16,
wherein the thin metal wire is formed of at least one of gold, silver, or copper.

18. A touch panel comprising:
the terminal connection structure of a conductive film for a touch panel according to claim 1.

* * * * *